(12) United States Patent
Chung

(10) Patent No.: US 9,785,762 B2
(45) Date of Patent: Oct. 10, 2017

(54) ELECTRONIC DEVICE AND METHOD FOR CONTROLLING ACCESS TO SAME

(71) Applicant: Chiun Mai Communication Systems, Inc., New Taipei (TW)

(72) Inventor: Kai-Wen Chung, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 54 days.

(21) Appl. No.: 14/864,557

(22) Filed: Sep. 24, 2015

(65) Prior Publication Data

US 2017/0011209 A1    Jan. 12, 2017

(30) Foreign Application Priority Data

Jul. 10, 2015    (CN) .......................... 2015 1 0404564

(51) Int. Cl.

| G06F 21/32 | (2013.01) |
| G06K 9/00 | (2006.01) |
| G06K 9/62 | (2006.01) |
| G06F 3/044 | (2006.01) |
| G06F 21/83 | (2013.01) |
| H04L 29/06 | (2006.01) |

(52) U.S. Cl.
CPC ............. G06F 21/32 (2013.01); G06F 3/044 (2013.01); G06F 21/83 (2013.01); G06K 9/001 (2013.01); G06K 9/0002 (2013.01); G06K 9/0008 (2013.01); G06K 9/00355 (2013.01); G06K 9/00892 (2013.01); G06K 9/6215 (2013.01); H04L 63/0861 (2013.01)

(58) Field of Classification Search
CPC .......... G06F 21/32; G06F 3/044; G06F 21/83; G06K 9/0002; G06K 9/0008; G06K 9/001; G06K 9/6215; G06K 9/00067; G06K 9/00073; G06K 9/00093; G06K 9/00355; G06K 9/00892; H04L 63/0861
USPC ....................... 382/125; 340/5.53, 5.83, 5.82
See application file for complete search history.

(56) References Cited

U.S. PATENT DOCUMENTS

| 2003/0044052 A1* | 3/2003 | Martin ............... G06K 9/00093 |
| | | 382/125 |
| 2008/0013808 A1* | 1/2008 | Russo ................ G06K 9/00026 |
| | | 382/125 |
| 2010/0240415 A1* | 9/2010 | Kim .................... G06F 3/03547 |
| | | 455/565 |
| 2015/0177969 A1* | 6/2015 | Stoufer ............... G06F 3/04847 |
| | | 715/746 |

\* cited by examiner

Primary Examiner — Jon Chang
(74) Attorney, Agent, or Firm — Steven Reiss

(57) ABSTRACT

A method of controlling access to an electronic device includes scanning a fingerprint of a user and obtaining a first image of the fingerprint. A preset number of feature points of the fingerprint from the first image are extracted. A distance value between each of the extracted feature points is adjusted to obtain a new image. A first slide path according to touch signals corresponding to the extracted feature points in the new image is identified. The first slide path is set as a password for unlocking the electronic device.

20 Claims, 7 Drawing Sheets

ELECTRONIC DEVICE AND METHOD FOR CONTROLLING ACCESS TO SAME

CROSS-REFERENCE TO RELATED APPLICATIONS

This application claims priority to Chinese Patent Application No. 201510404564.6 filed on Jul. 10, 2015, the contents of which are incorporated by reference herein.

FIELD

The subject matter herein generally relates to access controlling technology, and particularly to an electronic device and a method for controlling access to the electronic device.

BACKGROUND

An electronic device can be unlocked and accessed using a slide operation. However, this kind of access controlling method is not suitable for the electronic device that requires higher secure level.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
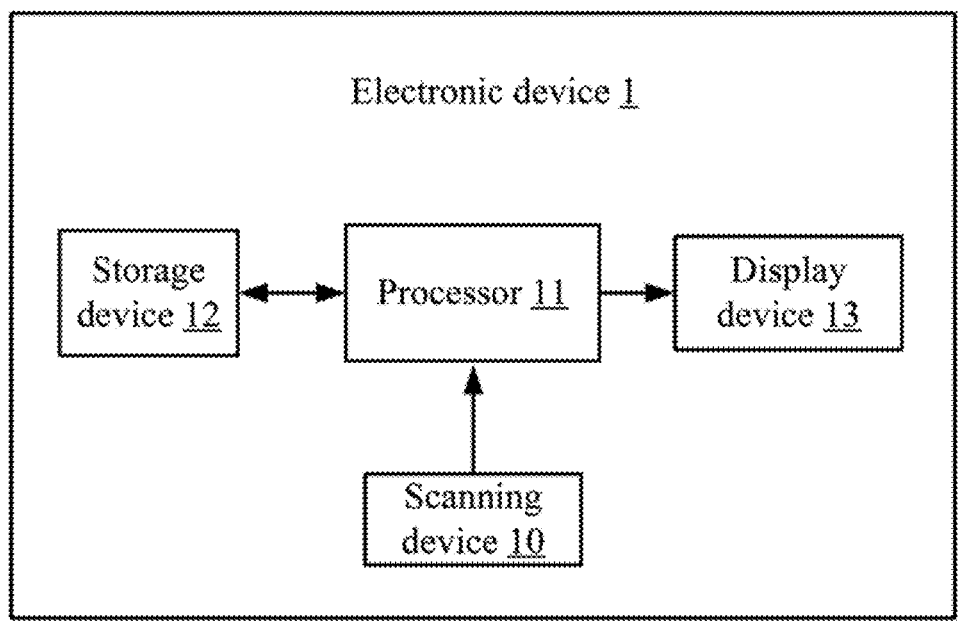
FIG. 1 is a block diagram of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one embodiment of an electronic device. Depending on the embodiment, an electronic device 1 may include, but are not limited to, a scanning device 10, at least one processor 11, a storage device 12, and a display device 13. The above components are electrically connected to each other. The electronic device 1 can be a smart phone, a personal digital assistant (PDA), a tablet computer, or any other suitable electronic device. FIG. 1 illustrates only one example of the electronic device 1 that can include more or fewer components than illustrated, or have a different configuration of the various components in other embodiments.

In one embodiment, the electronic device 1 can identify a slide path according touch signals corresponding to feature points of a fingerprint of a user, and set the slide path as a password for unlocking the electronic device 1. The following paragraphs provide description of the present invention using one example of locking the electronic device 1 and another example of unlocking the electronic device 1.

In the example of locking the electronic device 1, the scanning device 10 can scan a fingerprint of a user, and obtain a first image of the fingerprint. The scanning device 10 can further send the first image to the at least one processor 11. In one embodiment, the scanning device 10 can be a scanning module that can be configured on a front side of the electronic device 1. The at least one processor 11 can be a central processing unit (CPU), a microprocessor, or other data processor chip that performs functions of the electronic device 1.

The at least one processor 11 can obtain all feature points of the fingerprint from the first image using a preset image processing method. In one embodiment, the feature points may include, but are not limited to, one or more endpoints, and one or more bifurcation points. In one embodiment, the preset image processing method may include, but are not limited to, an image enhancement algorithm, a ridge valley detection algorithm, and an image segmentation algorithm.

Figure 2:
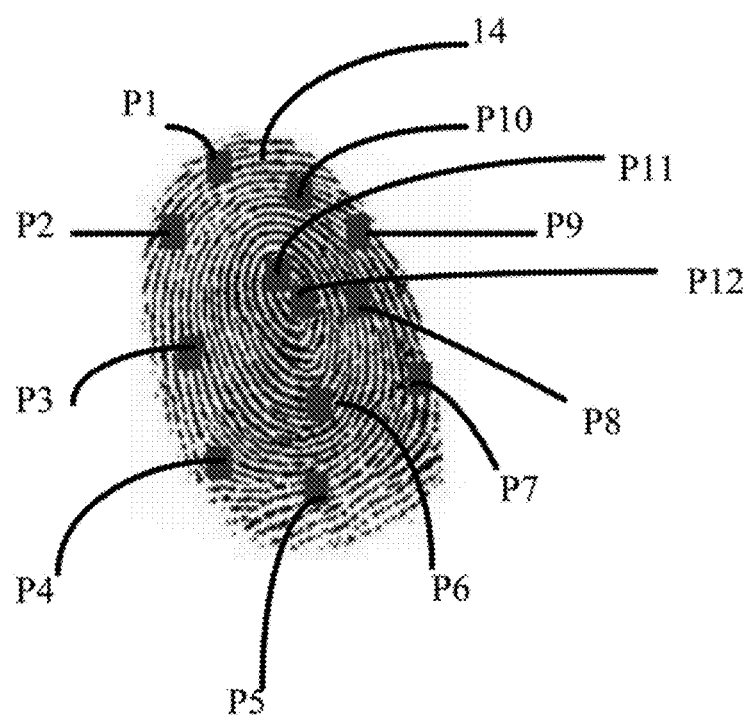
FIGS. 2 and 3 illustrate a diagrammatical view of an example of feature points of a fingerprint.

For example, as shown in FIG. 2, 40 feature points of the fingerprint from a first image 14 can be obtained by the at least one processor 11. To describe the present invention clearly, FIG. 2 only indicates 12 feature points, i.e., the P1-P12 indicated in the FIG. 2.

The storage device 12 can store all the feature points. In one embodiment, the storage device 12 can be an internal storage device, such as a flash memory, a random access memory (RAM) for temporary storage of information, and/or a read-only memory (ROM) for permanent storage of information. The storage device 12 can also be an external storage device, such as a smart media card, a secure digital card, and/or a flash card.

The at least one processor 11 further extracts a preset number of feature points from all the feature points in the first image. For example, the at least one processor 11 can extract 12 feature points from the 40 feature points. In another example, the preset number of feature points may be more or less than 12, such as 10.

In one embodiment, the at least one processor 11 can extract the preset number of feature points according to a weight value of each of all the feature points in the first image. In one embodiment, the weight value of each of the extracted feature points is greater than the weight value of each of the other feature points of the fingerprint.

For example, the at least one processor 11 can sort all the feature points in descending order, according to the weight values. Then the at least one processor 11 can extract the preset number of feature points that are arranged in the front.

In another example, the at least one processor 11 can randomly extract the preset number of feature points from all the feature points in the first image.

The at least one processor 11 can adjust a distance value between each of the extracted feature points. When the distance value between each of the extracted feature points has been adjusted, the at least one processor 11 can obtain a new image.

Figure 3:
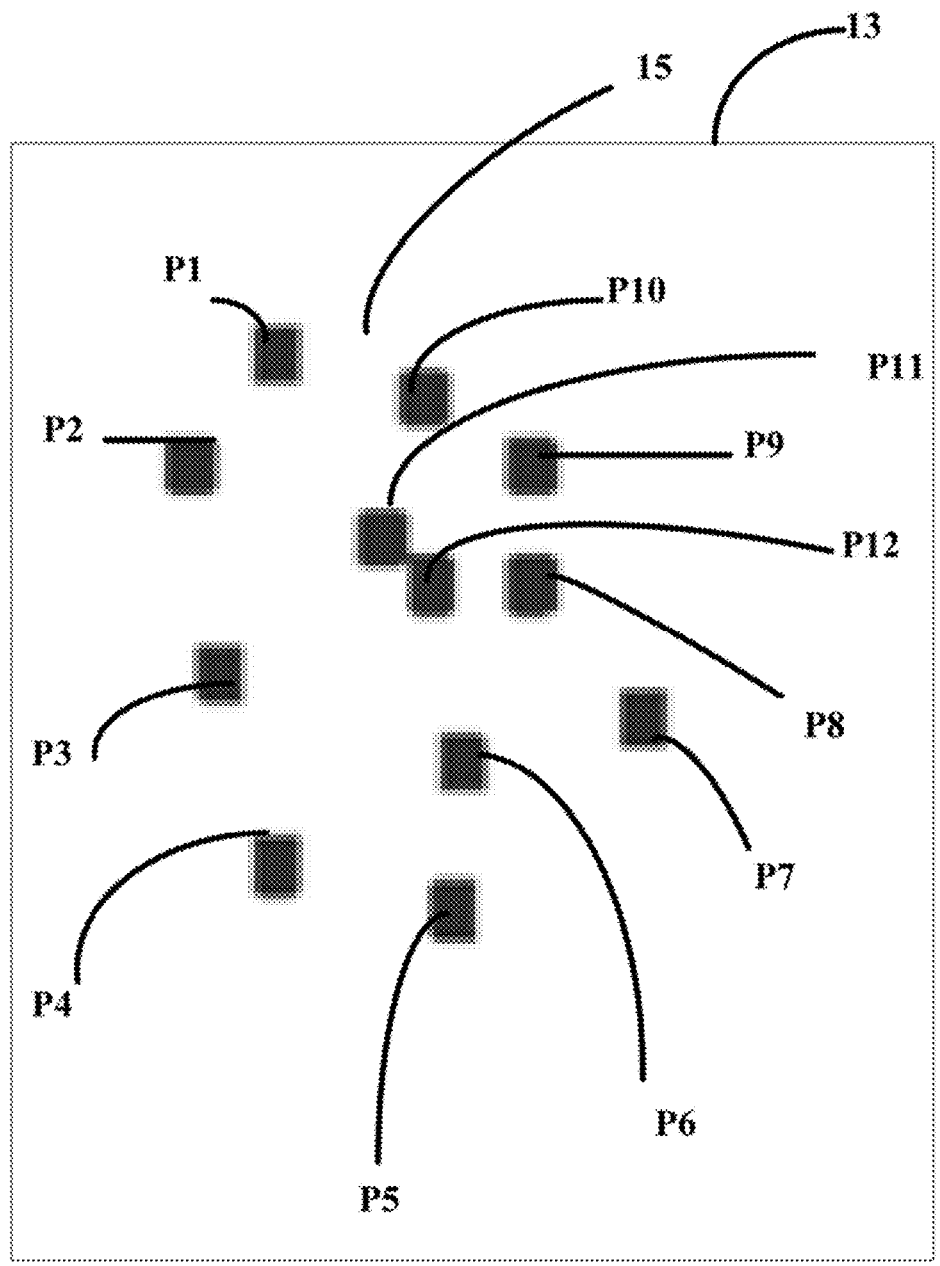

In one embodiment, the at least one processor 11 can adjust the distance value between each of the extracted feature points according to a resolution value of the display device 13 of the electronic device 1. For example, the at least one processor 11 can enlarge or reduce the distance value between each of the extracted feature points with a same ratio, to ensure a size of the new image is equal to a size of the display device 13. For example, as shown in FIG. 3, when the distance value between each of the extracted feature points has been adjusted, the at least one processor 11 can obtain a new image 15.

The display device 13 can display the new image. In one embodiment, the display device 13 can be a touch screen.

The at least one processor 11 can identify a first slide path according to touch signals corresponding to the extracted feature points in the new image. The at least one processor 11 can further identify a first order of touching each of the extracted feature points in the new image.

In one embodiment, the at least one processor 11 can identify the first slide path according to touch signals corresponding to some of the exacted feature points in the new image. The at least one processor 11 can further identify the first order of touching each of the some of the exacted feature points in the new image.

Figure 4:
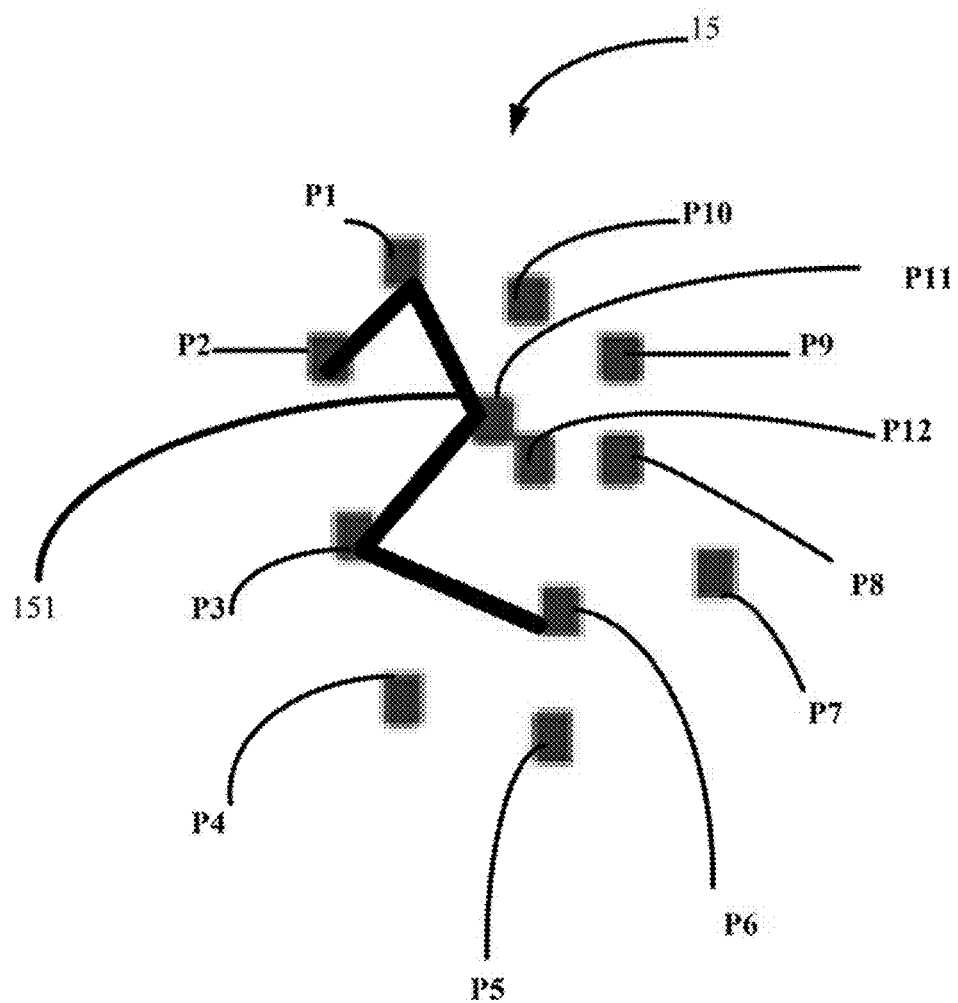
FIG. 4 illustrates a diagrammatical view of an example of identifying a slide path using the feature points.

For example, as shown in FIG. 4, the at least one processor 11 can identify a first slide path 151 according to touch signals corresponding to five feature points such as the P2, P1, P11, P3 and P6 in the new image 15. The at least one processor 11 can further identify that the user first touches the feature point P2, then the user successively touches the feature points P1, P11, P3 and P6. The sequence of the feature points P2, P1, P11, P3 and P6 is the first order of touching the exacted feature points.

In one embodiment, the at least one processor 11 can set the first slide path as a password for unlocking the electronic device 1. In other embodiments, the at least one processor 11 can set the first slide path and the first order as a password for unlocking the electronic device 1.

The storage device 12 can store the new image, the first slide path, and the first order.

The at least one processor 11 can lock the electronic device 1. In one embodiment, the at least one processor 11 can lock the electronic device 1 when the electronic device 1 is in a standby state for a predetermined time period. In other embodiments, the at least one processor 11 can lock the electronic device 1 when one or more predetermined keys of the electronic device 1 are pressed at a same time.

In the example of unlocking the electronic device 1, the display device 13 can display a message to prompt a user to scan a fingerprint of the user, when the electronic device 1 is locked.

The scanning device 10 can scan the fingerprint and obtain a second image of the fingerprint when the electronic device 1 is locked. The scanning device 10 can send the second image to the at least one processor 11.

The at least one processor 11 can obtain all feature points of the fingerprint from the second image using the preset image processing method.

The at least one processor 11 can determine whether the obtained feature points from the second image match the feature points stored in the storage device 12. When the obtained feature points from the second image match the feature points stored in the storage device 12, the at least one processor 11 can obtain the new image stored in the storage device 12, and control the display device 13 to display the new image.

In one embodiment, when a similarity degree between the obtained feature points from the second image and the feature points stored in the storage device 12 is greater than a preset value, the at least one processor 11 can determine the obtained feature points from the second image match the feature points stored in the storage device 12.

In one embodiment, when the display device 13 displays the new image obtained from the storage device 12, the at least one processor 11 can identify a second slide path according to touch signals corresponding to the feature points in the new image. The at least one processor 11 can further identify a second order of touching each of the feature points in the new image.

In other embodiments, when the display device 13 displays the new image obtained from the storage device 12, the at least one processor 11 can identify the second slide path according to touch signals corresponding to some of the feature points in the new image. The at least one processor 11 can further identify the second order of touching each of the some of the feature points in the new image.

The at least one processor 11 can determine whether the electronic device 1 is in condition for unlocking.

In one embodiment, the at least one processor 11 can determine whether the electronic device 1 is in condition for unlocking according to the second slide path. When the second slide path matches the first slide path stored in the storage device 12, the at least one processor 11 can determine the electronic device 1 is in condition for unlocking, and can unlock the electronic device 1. In this embodiment, the order of touching the feature points is irrelevant.

In other embodiments, the at least one processor 11 can determine whether the electronic device 1 is in condition for unlocking according to the second slide path, and the second order. When the second slide path matches the first slide path stored in the storage device 12, and the second order is equal to the first order stored in the storage device 12, the at least one processor 11 can determine the electronic device 1 is in condition for unlocking, and can unlock the electronic device 1. When the second slide path cannot match the first slide path stored in the storage device 12, or the second order is not equal to the first order stored in the storage device 12, the at least one processor 11 can determine the electronic device 1 is not in condition for unlocking.

In one embodiment, when the electronic device 1 is unlocked, the at least one processor 11 can further activate one or more predetermined applications. For example, the at least one processor 11 can activate a document processing application and/or a web browsing application.

Figure 5:
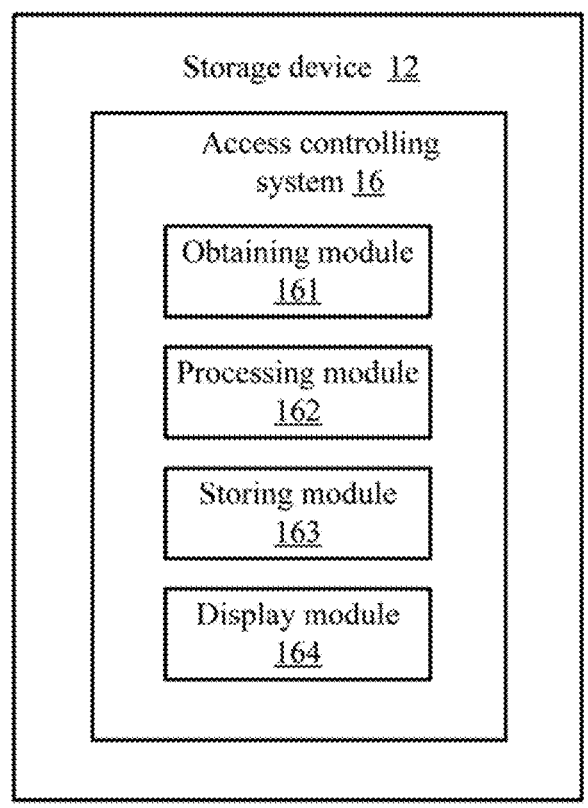
FIG. 5 is a block diagram of one embodiment of a controlling system installed in the electronic device of FIG. 1.

FIG. 5 illustrates a block diagram of one embodiment of an access controlling system 16 that is installed in the electronic device 1. In at least one embodiment, the access controlling system 16 can include an obtaining module 161, a processing module 162, a storing module 163, and a display module 164. The function modules 161-164 can include computerized codes in the form of one or more programs, which are stored in the storage device 12, and are executed by the at least one processor 11 of the electronic device 1 to provide functions of controlling access to the electronic device 1. Details of functions of the modules will be provided in conjunction with flow charts of FIG. 6 and FIG. 7 in the following paragraphs.

Figure 6:
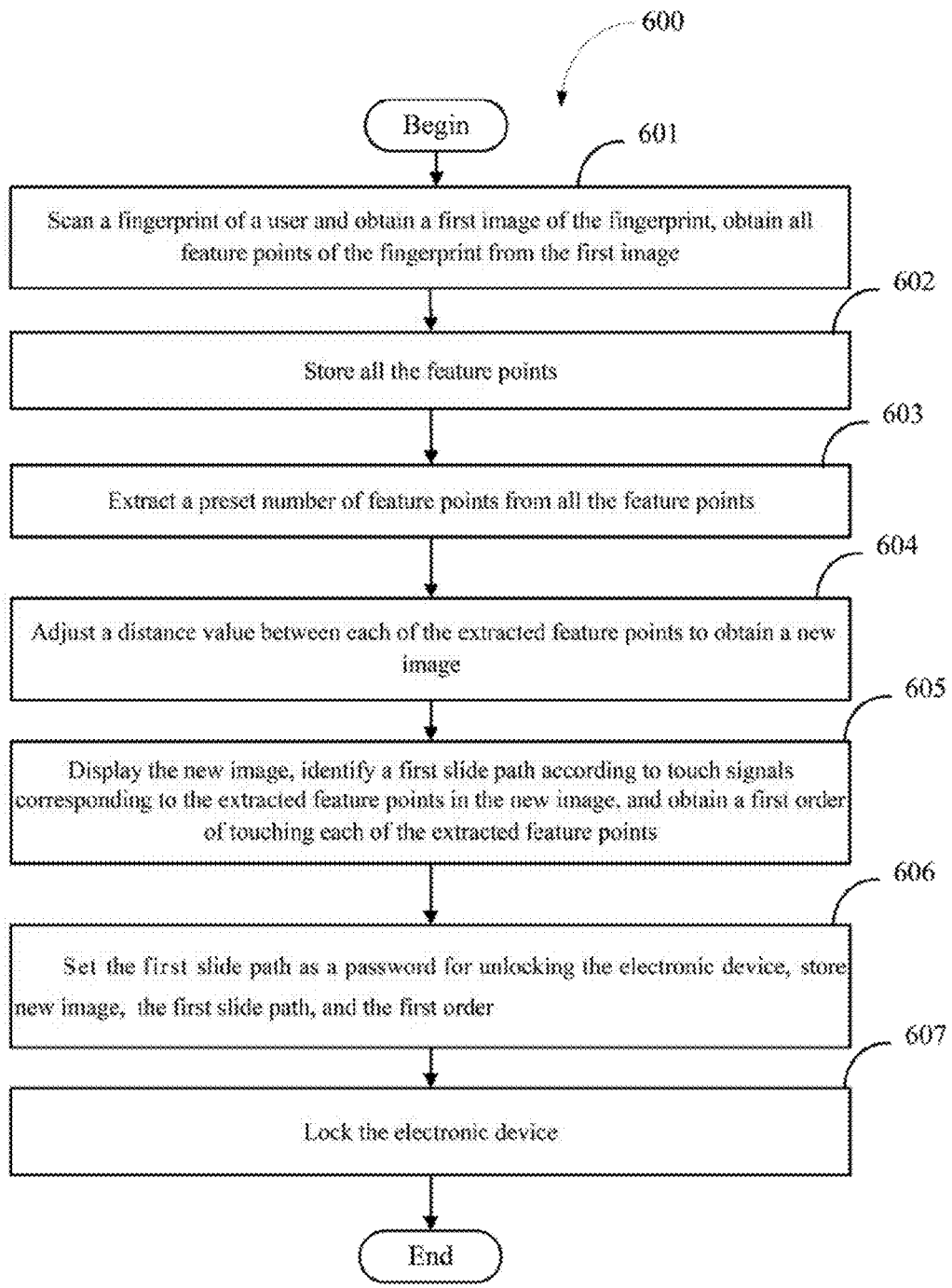
FIG. 6 illustrates a flow chart of one embodiment of a method for locking the electronic device of FIG. 1.

FIG. 6 illustrates a flowchart of one embodiment of locking the electronic device 1. The example method 600 is provided by way of example, as there are a variety of ways to carry out the method. The method 600 described below can be carried out using the configurations illustrated in FIG. 1, for example, and various elements of these figures are referenced in explaining example method 600. Each block shown in FIG. 6 represents one or more processes, methods or subroutines, carried out in the exemplary method 600. Additionally, the illustrated order of blocks is by example only and the order of the blocks can be changed according to the present disclosure. The exemplary method 600 can begin at block 601. Depending on the embodiment, additional steps can be added, others removed, and the ordering of the steps can be changed.

At block 601, the obtaining module 161 can scan a fingerprint of a user and obtain a first image of the fingerprint using the scanning device 10. The processing module 162 can obtain all feature points of the fingerprint from the first image using a preset image processing method. In one embodiment, the feature points may include, but are not limited to, one or more endpoints, and one or more bifurcation points. In one embodiment, the preset image processing method may include, but are not limited to, an image enhancement algorithm, a ridge valley detection algorithm, and an image segmentation algorithm.

For example, as shown in FIG. 2, 40 feature points of the fingerprint from a first image 14 can be obtained by the processing module 162. To describe the present invention clearly, FIG. 2 only indicates 12 feature points, i.e., the P1-P12 indicated in the FIG. 2.

At block 602, the storing module 163 can store all the feature points in the storage device 12.

At block 603, the processing module 162 further extracts a preset number of feature points from all the feature points in the first image. For example, the processing module 162 can extract 12 feature points from the 40 feature points. In another example, the preset number of feature points may be more or less than 12, such as 10.

In one embodiment, the processing module 162 can extract the preset number of feature points according to a weight value of each of all the feature points in the first image. In one embodiment, the weight value of each of the extracted feature points is greater than the weight value of each of the other feature points.

For example, the processing module 162 can sort all the feature points in descending order, according to the weight values. Then the processing module 162 can extract the preset number of feature points that are arranged in the front.

In another example, the processing module 162 can randomly extract the preset number of feature points from all the feature points in the first image.

At block 604, the processing module 162 can adjust a distance value between each of the extracted feature points. When the distance value between each of the extracted feature points has been adjusted, the processing module 162 can obtain a new image.

In one embodiment, the processing module 162 can adjust the distance value between each of the extracted feature points according to a resolution value of the display device 13 of the electronic device 1. For example, the processing module 162 can enlarge or reduce the distance value between each of the extracted feature points with a same ratio, to ensure a size of the new image is equal to a size of the display device 13. For example, as shown in FIG. 3, when the distance value between each of the extracted feature points has been adjusted, the processing module 162 can obtain a new image 15.

At block 605, the display module 164 can display the new image on the display device 13. In one embodiment, the display device 13 can be a touch screen.

The processing module 162 can identify a first slide path according to touch signals corresponding to the extracted feature points in the new image. The processing module 162 can further identify a first order of touching each of the extracted feature points in the new image.

In one embodiment, the processing module 162 can identify the first slide path according to touch signals corresponding to some of the exacted feature points in the new image. The processing module 162 can further identify the first order of touching each of the some of the exacted feature points in the new image.

For example, as shown in FIG. 4, the processing module 162 can identify a first slide path 151 according to touch signals corresponding to five feature points such as the P2, P1, P11, P3 and P6 in the new image 15. The at least one processor 11 can further identify that the user first touches the feature point P2, then the user successively touches the feature points P1, P11, P3 and P6. The sequence of the feature points P2, P1, P11, P3 and P6 is the first order of touching the exacted feature points.

At block 606, in one embodiment, the processing module 162 can set the first slide path as a password for unlocking the electronic device 1. In other embodiments, the processing module 162 can set the first slide path and the first order as a password for unlocking the electronic device 1.

The storing module 163 can store the new image, the first slide path, and the first order in the storage device 12.

At block 607, the processing module 162 can lock the electronic device 1. In one embodiment, the processing module 162 can lock the electronic device 1 when the electronic device 1 is in a standby state for a predetermined time period. In other embodiments, the processing module 162 can lock the electronic device 1 when one or more predetermined keys of the electronic device 1 are pressed at a same time.

Figure 7:
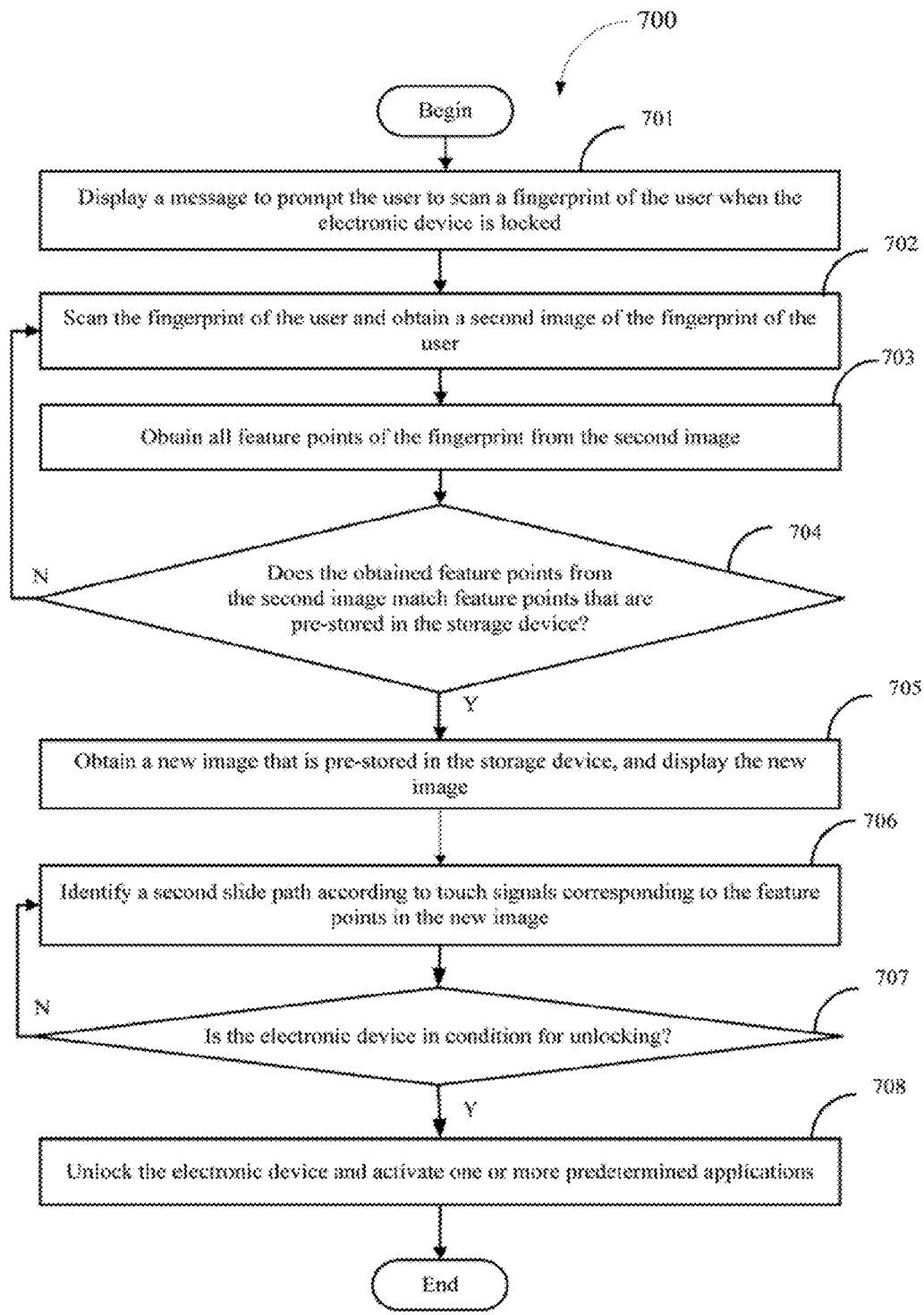
FIG. 7 illustrates a flow chart of one embodiment of a method for unlocking the electronic device of FIG. 1.

FIG. 7 illustrates a flowchart of one embodiment of unlocking the electronic device 1. The example method 700 is provided by way of example, as there are a variety of ways to carry out the method. The method 700 described below can be carried out using the configurations illustrated in FIG. 1, for example, and various elements of these figures are referenced in explaining example method 700. Each block shown in FIG. 7 represents one or more processes, methods or subroutines, carried out in the exemplary method 700. Additionally, the illustrated order of blocks is by example only and the order of the blocks can be changed according to the present disclosure. The exemplary method 700 can begin at block 701. Depending on the embodiment, additional steps can be added, others removed, and the ordering of the steps can be changed.

At block 701, when the electronic device 1 is locked, the display module 164 can display a message to prompt a user to scan a fingerprint of the user on the display device 13.

At block 702, the obtaining module 161 can scan the fingerprint and obtain a second image of the fingerprint using the scanning device 10 when the electronic device 1 is locked.

At block 703, the processing module 162 can obtain all feature points of the fingerprint from the second image using the preset image processing method.

At block 704, the processing module 162 can determine whether the obtained feature points from the second image match the feature points stored in the storage device 12. When the obtained feature points from the second image match the feature points stored in the storage device 12, the process goes to block 705. When the obtained feature points from the second image cannot match the feature points stored in the storage device 12, the process goes back to block 702.

In one embodiment, when a similarity degree between the obtained feature points from the second image and the feature points stored in the storage device 12 is greater than a preset value, the processing module 162 can determine the obtained feature points from the second image match the feature points stored in the storage device 12. When the similarity degree is less than or equal to the pre-set value, the processing module 162 can determine the obtained feature points from the second image cannot match the feature points stored in the storage device 12.

At block 705, the processing module 162 can obtain the new image stored in the storage device 12. The display module 164 can display the new image on the display device 13.

At block 706, in one embodiment, when the new image is displayed on the display device 13, the processing module 162 can identify a second slide path according to touch signals corresponding to the feature points in the new image. The processing module 162 can further identify a second order of touching each of the feature points in the new image.

In other embodiments, when the new image is displayed on the display device 13, the processing module 162 can identify the second slide path according to touch signals corresponding to some of the feature points in the new image. The processing module 162 can further identify the second order of touching each of the some of the feature points in the new image.

At block 707, the processing module 162 can determine whether the electronic device 1 is in condition for unlocking.

In one embodiment, the processing module 162 can determine whether the electronic device 1 is in condition for unlocking according to the second slide path. When the second slide path matches the first slide path stored in the storage device 12, the processing module 162 can determine the electronic device 1 is in condition for unlocking and the process goes to block 708. When the second slide path cannot match the first slide path stored in the storage device 12, the processing module 162 can determine the electronic device 1 is not in condition for unlocking, the process goes back to block 706. In this embodiment, the order of touching the feature points is irrelevant.

In other embodiments, the processing module 162 can determine whether the electronic device 1 is in condition for unlocking, according to the second slide path and the second order. When the second slide path matches the first slide path stored in the storage device 12, and the second order is equal to the first order stored in the storage device 12, the processing module 162 can determine the electronic device 1 is in condition for unlocking, and the process goes to block 708. When the second slide path cannot match the first slide path stored in the storage device 12, or the second order is not equal to the first order stored in the storage device 12, the processing module 162 can determine the electronic device 1 is not in condition for unlocking, and the process goes to block 706.

At block 708, the processing module 162 can unlock the electronic device 1. In one embodiment, when the electronic device 1 is unlocked, the processing module 162 can further activate one or more predetermined applications. For example, the processing module 162 can activate a document processing application and/or a web browsing application.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for controlling access to an electronic device, the method comprising:
   scanning a fingerprint of a user and obtaining a first image of the fingerprint;
   identifying all feature points of the fingerprint from the first image;
   storing all the feature points;
   sorting all the feature points in a predetermined order according to a weight value of each of the all feature points;
   extracting a preset number of feature points that are arranged in front of the others of all the feature points;
   adjusting a distance value between each of the extracted feature points to obtain a new image;
   displaying the new image;
   identifying a first slide path according to touch signals corresponding to the extracted feature points in the new image;
   setting the first slide path as a password for unlocking the electronic device; and
   storing the new image and the first slide path.

2. The method according to claim 1, wherein the predetermined order is a descending order.

3. The method according to claim 1, wherein the distance value between each of the extracted feature points is adjusted according to a resolution value of a display device of the electronic device.

4. The method according to claim 3, wherein the distance value between each of the extracted feature points is enlarged or reduced with a same ratio, to ensure a size of the new image is equal to a size of the display device.

5. The method according to claim 1, wherein the method further comprising:

obtaining a first order of touching a plurality of the extracted feature points; and storing the first order as a part of the password.

6. A method for controlling access to an electronic device, the method comprising:

scanning a fingerprint of a user when the electronic device is locked;

obtaining a second image of the fingerprint;

obtaining all feature points of the fingerprint from the second image;

obtaining an image that is pre-stored in a storage device of the electronic device when the obtained feature points from the second image match feature points that are pre-stored in the storage device, wherein the obtained image is formed by a preset number of feature points that are pre-stored in the storage device, wherein the preset number of feature points are extracted by: sorting first feature points extracted from a first image of a fingerprint of the user in a predetermined order according to a weight value of each of the first feature points, and extracting the preset number of first feature points that are arranged in front of the others of all the first feature points;

displaying the obtained image;

identifying a second slide path according to touch signals corresponding to the feature points in the obtained image; and unlocking the electronic device when the electronic device is determined to be in condition for unlocking according to the second slide path.

7. The method according to claim 6, wherein when a similarity degree between the obtained feature points from the second image and the feature points pre-stored in the storage device is greater than a preset value, the obtained feature points from the second image are determined to match the feature points that are pre-stored in the storage device.

8. The method according to claim 6, wherein the predetermined order is a descending order, wherein the electronic device is unlocked when the second slide path matches a first slide path pre-stored in the storage device.

9. The method according to claim 6, wherein the electronic device is unlocked when the second slide path matches a first slide path pre-stored in the storage device, and a second order of touching a plurality of the feature points in the obtained image matches a first order pre-stored in the storage device.

10. The method according to claim 6, further comprising:

activating one or more predetermined applications when the electronic device is unlocked.

11. An electronic device comprising a scanning device, a display device, at least one processor, and a storage device, wherein:

the scanning device scans a fingerprint of a user and obtains a first image of the fingerprint;

the at least one processor identifies all feature points of the fingerprint from the first image;

the storage device stores all the feature points;

the at least one processor sorts all the feature points in a predetermined order according to a weight value of each of the all feature points;

the at least one processor extracts a preset number of feature points that are arranged in front of the others of all the feature points;

the at least one processor adjusts a distance value between each of the extracted feature points to obtain a new image;

the at least one processor controls the display device to display the new image;

the at least one processor identifies a first slide path according to touch signals corresponding to the extracted feature points in the new image;

the at least one processor sets the first slide path as a password for unlocking the electronic device; and the storage device stores the new image and the first slide path.

12. The electronic device according to claim 11, wherein the predetermined order is a descending order.

13. The electronic device according to claim 11, wherein the at least one processor adjusts the distance value between each of the extracted feature points of the fingerprint according to a resolution value of the display device.

14. The electronic device according to claim 13, wherein the at least one processor enlarges or reduces the distance value between each of the extracted feature points with a same ratio, to ensure a size of the new image is equal to a size of the display device.

15. The electronic device according to claim 11, wherein the at least one processor further obtains a first order of touching a plurality of the extracted feature points, and the storage device further stores the first order as a part of the password.

16. An electronic device comprising a scanning device, a display device, at least one processor, and a storage device, wherein:

the scanning device scans a fingerprint of a user when the electronic device is locked;

the scanning device obtains a second image of the fingerprint;

the at least one processor obtains all feature points of the fingerprint from the second image;

the at least one processor obtains an image that is pre-stored in the storage device when the obtained feature points from the second image match feature points that are pre-stored in the storage device, wherein the obtained image is formed by a preset number of feature points that are pre-stored in the storage device, wherein the preset number of feature points are extracted by: sorting first feature points extracted from a first image of a fingerprint of the user in a predetermined order according to a weight value of each of the first feature points, and extracting the preset number of first feature points that are arranged in front of the others of all the first feature points;

the at least one processor controls the display device to display the obtained image;

the at least one processor identifies a second slide path according to touch signals corresponding to the feature points in the obtained image; and the at least one processor unlocks the electronic device when the electronic device is determined to be in condition for unlocking according to the second slide path.

17. The electronic device according to claim 16, wherein when a similarity degree between the obtained feature points from the second image and the feature points pre-stored in the storage device is greater than a preset value, the at least one processor determines the obtained feature points from the second image match the feature points that are pre-stored in the storage device.

18. The electronic device according to claim 16, wherein the predetermined order is a descending order, wherein the at least one processor unlocks the electronic device when the second slide path matches a first slide path pre-stored in the storage device.

19. The electronic device according to claim 16, wherein the at least one processor unlocks the electronic device when the second slide path matches a first slide path pre-stored in the storage device, and a second order of touching a plurality of the feature points in the obtained image matches a first order pre-stored in the storage device.

20. The electronic device according to claim 16, wherein the at least one processor further activates one or more predetermined applications when the electronic device is unlocked.

* * * * *